United States Patent [19]
Kimura et al.

[11] Patent Number: 5,397,827
[45] Date of Patent: Mar. 14, 1995

[54] THERMOPLASTIC POLYESTER COMPOSITIONS AND FILMS FORMED USING SAME

[75] Inventors: Masahiro Kimura, Shizuoka; Tomoji Saeki, Otsu; Masaru Suzuki, Itou; Minoru Yoshida, Mishimashi; Toshihiro Sasaki, Susuono, all of Japan

[73] Assignee: Toray Industries, Inc., Japan

[21] Appl. No.: 849,444

[22] PCT Filed: May 19, 1992

[86] PCT No.: PCT/JP91/01251
§ 371 Date: Jul. 21, 1992
§ 102(e) Date: Jul. 21, 1992

[87] PCT Pub. No.: WO92/05222
PCT Pub. Date: Apr. 2, 1992

[30] Foreign Application Priority Data

Sep. 21, 1990 [JP] Japan ................................ 2-252459
Nov. 16, 1990 [JP] Japan ................................ 2-308559

[51] Int. Cl.$^6$ .............................................. C08K 3/10
[52] U.S. Cl. .................................... 524/413; 528/272; 528/275; 528/279; 528/283; 528/286; 528/293; 528/308.1; 528/308.6; 264/210.7
[58] Field of Search ............... 528/272, 275, 279, 283, 528/286, 293, 308.1, 308.6; 524/413, 414, 425, 430, 433, 442; 264/210.7

[56] References Cited

U.S. PATENT DOCUMENTS

| | | | |
|---|---|---|---|
| 4,421,887 | 12/1983 | Horie et al. | 524/317 |
| 4,526,738 | 7/1985 | Miyoshi et al. | 264/176 |
| 4,590,119 | 5/1986 | Kawakami et al. | 428/216 |
| 4,767,657 | 8/1988 | Sakamoto et al. | 428/143 |

FOREIGN PATENT DOCUMENTS

| | | |
|---|---|---|
| 59-100156 | 6/1984 | Japan . |
| 1-27486 | 11/1984 | Japan . |
| 61-31429 | 2/1986 | Japan . |
| 62-44775 | 5/1986 | Japan . |
| 61-254328 | 11/1986 | Japan . |
| 63-72730 | 4/1988 | Japan . |
| 1-176556 | 7/1989 | Japan . |
| 1176556 | 7/1989 | Japan . |
| 1-198637 | 8/1989 | Japan . |
| 1198637 | 8/1989 | Japan . |

Primary Examiner—Samuel A. Acquah
Attorney, Agent, or Firm—Austin R. Miller

[57] ABSTRACT

The thermoplastic polyester compositions of the present invention are characterized by containing special colloidal silica particles having a straight-chain or branched shape, so when formed into film, particularly film for magnetic tape, there are attained superior abrasion resistance, scratch resistance and sliding property.

15 Claims, 1 Drawing Sheet

Figure 1:
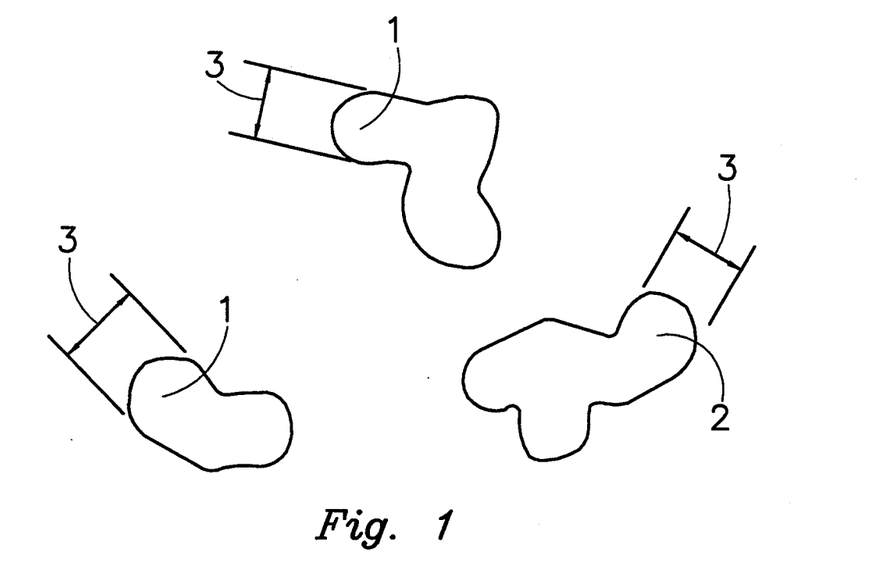

*Fig. 1*

Figure 2:
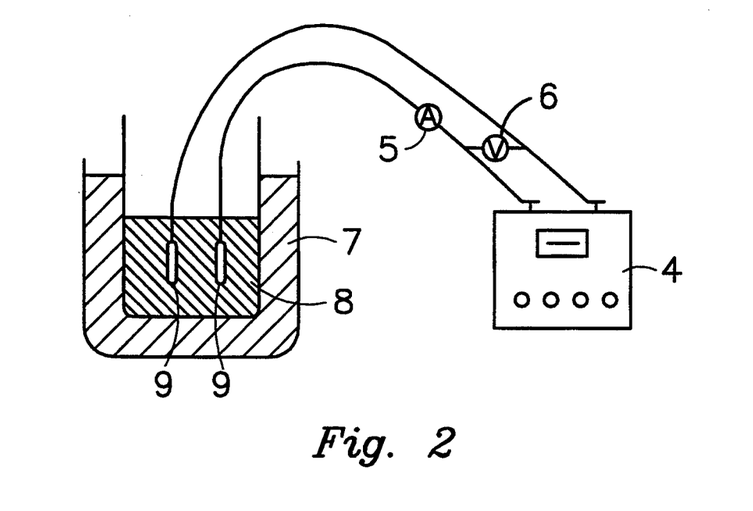

*Fig. 2*

THERMOPLASTIC POLYESTER COMPOSITIONS AND FILMS FORMED USING SAME

FIELD OF ART

The present invention relates to thermoplastic polyester compositions and films formed using the same. More particularly, the present invention is concerned with thermoplastic polyester compositions prepared by dispersing fine colloidal silica particles having a straight-chain or branched shape uniformly in thermoplastic polyesters and suitable for obtaining films or fibers superior in sliding property, abrasion resistance and scratch resistance (a property difficult to be scratched).

BACKGROUND ART

In general, thermoplastic polyesters, e.g. polyethylene teterephthalate, have superior dynamic and chemical properties and are in wide use as shaped articles such as films and fibers.

However, polyesters have involved a problem of deterioration in productivity due to poor sliding property thereof at the time of processing into shaped articles. For remedying this problem, there has been adopted heretofore a method wherein inactive particles are dispersed in polyesters to give uneven surfaces of the resulting shaped articles. For example, in Japanese Patent Laid Open No.86471/1977 (JP52-864791A) there is proposed a method using inorganic particles of a specified specific surface area, and in Japanese Patent Laid Open No.171623/1984 (JP59-171623A) there is proposed a method using spherical colloidal silica of 0.1 to 1μ in diameter. These methods are effective in solving the problem of poor sliding property, but shaped articles obtained by using the compositions described therein are not at a satisfactory level in point of abrasion resistance and scratch resistance.

In the case where the abrasion resistance of a shaped article, e.g. film for magnetic tape, is low, abrasion dust of the film is apt to be produced during the manufacture of the magnetic tape, and drop-out of application occurs in a magnetic layer applying step, this causing drop-out of magnetic recording, etc. When a magnetic tape is used, in many cases, the tape is allowed to travel in contact with a recording/reproducing apparatus or the like, so abrasion dust produced at the time of such contact is deposited on a magnetic material, thus causing drop-out of magnetic recording at the time of recording or playback.

In the case where the scratch resistance of a shaped article, e.g. film for magnetic tape, is low, a foreign matter if present during the manufacture of the magnetic tape would easily scratch the film surface, resulting in drop-out of magnetic recording or easy scratching of the film surface during high-travelling of the magnetic tape.

In the case of film for magnetic tape, it is necessary to have sliding property, abrasion resistance and scratch resistance not only during the manufacture of the magnetic tape but also in use as the magnetic tape. For improving the abrasion resistance, there has been proposed a method of incorporating fine particles in polyester, for example, dispersing in polyester a fine spherical colloidal silica having an average particle diameter of 0.01 to 0.1 μm. In this case, the particles may drop out due to a strong force exerted thereon from a roller with which the film formed by using such polyester is in contact, and the particles thus dropped out scratch the film surface.

The present inventors have found out that the kind, size and shape of particles contained in a polyester film are predominant factors which influence the abrasion resistance and scratch resistance of the film. And as a result of earnest studies, we accomplished the present invention.

Silicas having special particle shapes are disclosed in U.S. Pat. Nos. 2,680,721 and 2,900,348 and Japanese Patent Laid Open No.317115/1989 (JP1-317115A) (corresponding to European Patent No.0335195), but these publications are concerned with the preparation of mere silica sol. Prior to the present invention it had not been found out that a polyester-silica combination would afford a film, especially a film for magnetic tape, superior in sliding property, abrasion resistance and scratch resistance.

The present invention has been accomplished for eliminating the above-mentioned drawbacks of the prior art and it is the object of the invention to provide thermoplastic polyester compositions capable of affording films and fibers superior in all of sliding property, abrasion resistance and scratch resistance.

DISCLOSURE OF THE INVENTION

The aforementioned object of the present invention is attained by a composition comprising a thermoplastic polyester and colloidal silica particles, the colloidal silica particles having a ratio, $D_1/D_2$, of a particle diameter ($D_1$ mμ) as measured by a dynamic light-scattering method to a particle diameter ($D_2$ mμ) as measured by a nitrogen gas absorbing method of 2 or more in which $D_1$ is in the range of 60 to 600 mμ, further having a thickness in the range of 41 to 100 mμ in observation using an electron microscope, and having a straight-chain or branched shape.

The colloidal silica particles used in the present invention have a size of 60 to 600 mμ in terms of a particle diameter $D_1$ thereof as measured by a dynamic light-scattering method, in the state of slurry thereof, and have an elongated shape at a uniform thickness in the range of 41 to 100 mμ as observed using an electron microscope. The measurement of the particle diameter by such dynamic light-scattering method is explained on page 4814 of Journal of Chemical Physics, Vol.57, No.11 (December, 1972). For example, the particle diameter can be measured easily by using a commercially available measuring device, e.g. N4 (a product of Coulter Co.). A value of $D_1$ smaller than 60 mμ is not desirable because the particle dispersion in the polyester is poor. A value of $D_1$ exceeding 600 mμ is not desirable, either, because the evenness of film is deteriorated. A more preferred $D_1$ range is from 60 to 200 mμ. The colloidal silica particles are characterized by having a $D_1/D_2$ ratio of 2 or more, the $D_2$ being a particle diameter given by the equation $D_2 = 2720/S$ and determined by a nitrogen gas absorbing method (hereinafter referred to simply as the "BET" method) as an approximate degree of elongation of the particles, in which S represents a specific surface area in $m^2/g$. For attaining good dispersibility of the particles in the polyester as well as good sliding property and abrasion and scratch resistance of the polyester, the $D_1/D_2$ ratio is preferably not smaller than 2 and smaller than 10, more preferably not smaller than 2 and smaller than 7, particularly preferably not smaller than 2 and smaller than 5.

The shape of the colloidal silica particles used in the present invention will now be described with reference to model shapes illustrated in FIG. 1. For example, as shown in FIG. 1 as 1, the particles may be linear or angled (straight-chain colloidal silica particles), or as shown in FIG. 1 as 2, the particles may be elongated through a branch point (branched colloidal particles). It is difficult to distinguish the particle shape from a secondary particle agglomerate or an overlap of particles, but in the case of a stable sol and when the sol is subjected to an appropriate dispersion treatment, then fixed to a collodion membrane and its dispersed state is observed using a transmission type electron microscope, it is possible to observe the straight-chain colloidal silica particles 1 or branched colloidal silica particles 2 both having the same brightness, at an approximately uniform thickness. The particle thickness thus observed is defined as indicated at 3 in FIG. 1. The reason why this is not a secondary agglomerate is that the particles when observed are not approximately uniform in thickness. And the reason why this is not an overlap of particles is that the particles do not basically have portions different in brightness. It is presumed that the particles in question basically have elongation only within the same plane, and this is related to the face that the stability of slurry is good. The silica particles having a straight-chain or branched shape may be crystalline or amorphous, but the latter is preferred. Usually, the particles are preserved in the state of slurry which is more stable.

The kind of particles used in the present invention is limited to silica as mentioned above. Even particles other than silica particles, when formed into film, may exhibit improved resistance to abrasion and to scratch if the foregoing $D_1$, $D_2$ and thickness parameters thereof are within the foregoing ranges, but, for example in the case of alumina, it causes deterioration in heat resistance of the polymer used so it not desirable.

The colloidal silica used in the present invention is prepared in the following manner for example.

First, an aqueous solution containing a water-soluble calcium salt or magnesium salt is added and mixed in an appropriate amount into a colloidal aqueous solution of active silicic acid having a pH value of not larger than 6. Then, an alkali metal hydroxide, a water-soluble organic base, or a water-soluble silicate thereof, is added and mixed in an appropriate amount, and the resulting mixture is heated at 60° C. or higher for a suitable period of time. In this case, it is desirable to add a trivalent metal salt into the aqueous slurry of active silicic acid. The colloidal silica thus prepared has a straight-chain or branched shape and its shape can be controlled by adjusting the initial pH value, the amount of the calcium salt- or magnesium salt-containing aqueous solution to be added, the amount of the alkali metal hydroxide, water-soluble organic base or water-soluble silicate thereof to be added, the method of mixing, and heating temperature and time. The amount of the calcium salt or magnesium salt to be added is preferably in the range of 300 to 1,500 ppm, more preferably 500 to 1,200 ppm, in terms of a weight ratio relative to $SiO_2$ in the colloidal aqueous solution.

The method of adding the fine colloidal silica particles having a straight-chain or branched shape in the present invention is not specially limited, but usually it is preferable that the particles be added as a slurry which is in the state of a stable sol.

In the present invention, in order to improve the dispersibility of the particles in the polyester, it is desirable that the sulfur atom-containing compound in the slurry be present in an amount of not smaller than 50 ppm and not larger than 3000 ppm in weight ratio as $SO_3$ relative to the $SiO_2$ which constitutes the colloidal silica particles. A proportion thereof in the range of 100 to 2,500 ppm is more preferred. In this case, a secondary agglomeration of the particles in the polyester will not occur, nor will there be any foreign matter derived from the sulfur atom-containing compound. The sulfur atom is added, for example as a sulfate, at the time of production of the particles.

In order to ensure the stability of the slurry, it is preferable that the sodium content of the slurry be in the range of 1,000 to 20,000 ppm, more preferably 2,000 to 7,000 ppm, in weight ratio as $Na_2O$ relative to the $SiO_2$ which constitutes the colloidal silica particles. In this case, the particles will not agglomerate during preservation of the slurry. Na is added, for example as an alkali metal hydroxide, at the time of production of the particles.

The particle slurry used in the present invention may further contain other components such as, for example, very small amounts of cation and anion.

Since such stable colloidal silica slurry is used in the present invention, how and when the slurry is to be incorporated in the polyester may be the same as in the prior art. Preferably, the slurry is a slurry of glycol which is a starting material in the preparation of the polyester. The slurry concentration is preferably in the range of 0.5 to 40 wt %, more preferably 1 to 20 wt %, as $SiO_2$ wt %. These ranges are desirable because the dispersibility of the particles in the polyester is improved. The water content of the slurry at the time of addition thereof to the polyester is preferably not higher than 1 wt %, more preferably not higher than 0.5 wt %. The slurry may be added any time, for example, at the stage of monomers, or during polymerization, or before or after the polymerization. After the preparation of the polymer, the particle slurry may be added and dispersed using a vent extruder.

The total content of the colloidal silica in the polyester composition of the present invention is preferably in the range of 0.001 to 20 wt %, more preferably 0.005 to 10 wt %, still more preferably 0.01 to 5 wt %, in view of the balance of characteristics when formed into film, such as sliding property, surface evenness and magnetic conversion properties.

From the standpoint of attaining good sliding property and high resistance to abrasion and scratch, it is preferable that the polyester composition of the present invention when formed into film contain both the foregoing colloidal silica particles and inactive particles.

The "inactive particles" as referred to herein mean both inorganic and organic particles, but it is preferable that their particle diameter measured by a dynamic light scattering method be larger than $D_1$ of the colloidal silica particles, more preferably in the range of 200 to 2,000 mμ.

As examples of inactive inorganic particles there are mentioned particles of such inorganic oxides as titanium oxide, silicon oxide, zirconium oxide and aluminum oxide, inorganic carbonates such as calcium carbonate and barium carbonate, inorganic phosphates such as calcium phosphate and sodium phosphate, inorganic sulfates such as barium sulfate and calcium sulfate, inorganic compound oxides such as kaolin and talc, fluorides typified by fluorite, as well as other inorganic particles used commonly such as potassium titanate and aluminum hydroxide. Particularly, titanium oxide, silicon oxide, calcium carbonate and calcium phosphate are preferred.

For preventing the formation of a coarse prominence it is desirable for these particles not to incorporate therein coarse particles of 5 μm or larger in a particle size distribution thereof. And for obtaining particles of such a particle size distribution, it is effective to remove agglomerated particles by a dispersing operation such as the use of a sand mill or remove agglomerated particles and coarse particles by a classifying operation. But it is more desirable to make adjustment into a uniform particle size at the stage of preparation of the particles.

For example, carbonic acid gas is blown into an aqueous calcium hydroxide solution to obtain calcite type calcium carbonate particles which are somewhat uniform in particle diameter, and a small proportion of remaining coarse particles are removed by dispersion and classifying, or carbonic acid gas is blown into a solution of calcium hydroxide in alcohol to obtain vaterite type calcium carbonate particles, and a trace amount of remaining coarse particles are removed by filtration.

As examples of inactive organic particles there are mentioned non-incorporated particles based on the residue of catalyst in the preparation of the polyester, particles of organic low-molecular compounds such as calcium terephthalate, barium terephthalate and sodium benzoate, carbon black, as well as organic high-molecular compounds such as polytetrafluoroethane resins, polystyrene resins, silicone resins and crosslinked polymer resins. Particularly, crosslinked polymer resin particles are preferred. Examples are copolymers of monovinyl compounds (X) each having only one aliphatic unsaturated bond in the molecule and compounds (Y) as crosslinking components each having two or more aliphatic unsaturated bonds in the molecule, and polymer particles comprising only the latter, crosslinking components (Y). But there is made no limitation thereto.

As examples of the compounds (X) there are mentioned aromatic monovinyl compounds such as styrene, α-methylstyrene, fluorostyrene, and vinyl pyridine; vinyl cyanide compounds such as acrylonitrile and methacrylonitrile; acrylate monomers such as butyl acrylate, 2-ethylhexyl acrylate, methyl acrylate, 2-hydroxyethyl acrylate, glycidyl acrylate, and N,N'-dimethylaminoethyl acrylate; methacrylate monomers such as butyl methacrylate, 2-ethylhexyl methacrylate, methyl methacrylate, 2-hydroxyethyl methacrylate, glycidyl methacrylate, and N,N'-dimethylaminoethyl methacrylate; monomers or dicarboxylic acids such as acrylic acid, methacrylic acid, maleic acid, and itaconic acid, as well as dicarboxylic acid anhydrides; and amide type monomers such as acrylamide and methacrylamide. Particularly, styrene, α-methylstyrene and p-methylstyrene are preferred.

As examples of compounds (Y) there are mentioned divinylbenzene compounds as well as polyvalent acrylates and methacrylates such as trimethylolpropane triacrylate, trimethylolpropane trimethacrylate, polyethylene glycol diacrylate, polyethylene glycol dimethacrylate, 1,3-butylene glycol diacrylate, 1,3-butylene glycol dimethacrylate, trimethylolpropane triacrylate, and trimethylolpropane trimethacrylate. Particularly, divinylbenzene, butyl acrylate, ethylene glycol dimethacrylate, and trimethylolpropane trimethacrylate, are preferred. The compounds (X) may be used as a mixture of two or more and this is also the case with the compounds (Y).

As to the composition of the crosslinked polymer particles, preferred examples are crosslinked polymer particles obtained by using divinylbenzene alone, as well as those using styrene-divinylbenzene copolymer, styrene-acrylonitrile-divinylbenzene copolymer, styrene-methyl methacrylate-divinylbenzene copolymer, and butyl acrylate divinylbenzene copolymer. Particularly, crosslinked polymer particles using divinylbenzene, styrene-divinylbenzene copolymer, and butyl acrylate-divinylbenzene copolymer, are preferred in point of thermostability.

In connection with the thermostability of crosslinked polymer particles, the particles having a heat resistance of 380° C. or higher, more preferably 400° C. or higher, particularly preferably 410° C. or higher, in terms of a thermal decomposition temperature (10% loss temp.) as measured with a thermobalance, are preferred. This is desirable because the agglomeration of the particles in the preparation of the polyester composition or during melt molding or during the recovery of a shaped article or re-utilization thereof, and the resulting impairment of surface evenness and abrasion resistance, are prevented. For attaining such thermostability, it is necessary to effect a high degree of crosslinking by using the compound (Y) as a crosslinking component. Although no special limitation is placed on the kind of a crosslinking component to be used, divinylbenzene is preferred. In this case, it is necessary to use divinylbenzene in an amount of 12 wt % or more, preferably 35 wt % or more, more preferably 55 wt % or more, as a pure divinylbenzene relative to monomer.

For attaining excellent sliding property, surface evenness and clarity, it is preferable that the crosslinked polymer particles be spherical in shape and have a uniform particle size distribution. From this standpoint, those having a volumetric shape parameter of 0.35 to 0.52, more preferably 0.45 or more, are preferred, provided the volumetric shape parameter, f, is represented as $f = V/D^3$ wherein V is a particle volume ($\mu m^3$) and D is a maximum diameter ($\mu m$) at a projection surface of the particles.

As the crosslinked polymer particles there may be used those obtained by a known method. The following are mentioned as examples of known methods, including emulsion polymerization:

(1) Soap-free polymerization method not using or using an extremely small amount of an emulsifier.

(2) Seed polymerization method wherein polymer particles are added into a polymerization system prior to an emulsion polymerization.

(3) Core shell polymerization method wherein a portion of monomer component is emulsion-polymerized and the remaining monomer component is polymerized in that polymerization system.

(4) Polymerization method using Ugelsted which is shown in Japanese Patent Laid Open Nos.97582/1979 (JP54-97582A) and 126288/1979 (JP54-126288A).

(5) The above method (4), not using a swelling adjuvant.

Particularly, the above methods (3) and (4) are preferred because it is possible to obtain spherical crosslinked polymer particles having a uniform particle size distribution.

In relation to affinity for the polyester it is desirable that the crosslinked polymer particles have a functional group. Although the kind of such functional group is not specially limited, examples include carboxyl group, hydroxyl group, sulfonic acid group, ester group, and metallic salts of carboxyl group, with carboxyl group, metallic salts thereof and hydroxyl group being particularly preferred.

Although no special limitation is placed on the method of introducing a functional group, a method which is preferred from the standpoint of thermostability of the particles involves once preparing particles serving as a matrix of a high crosslinking degree and then introducing the functional group into the surfaces of the matrix particles. For example, in the case of introducing a sodium salt of carboxyl group, there are prepared highly crosslinked particles of divinylbenzene using a styrene-divinylbenzene copolymer as a particulate matrix, and thereafter the carboxyl group is introduced into the particle surface using methacrylic acid. A functional group of —COONa is introduced into the particle surface by adjusting the interior of the particle preparation system to an alkaline side.

Regarding how and when the inactive particles are to be incorporated into the polyester, there may be adopted a conventional was of doing, for example, a method wherein the particles are added in the form of a powder or a glycol slurry into the polyester reaction system, or a method wherein the particles are kneaded into the polyester in the form of a powder or a slurry using a low-boiling solvent. Particularly in the case of inactive inorganic particles, it is preferable that the particles be added to the polyester reaction system in the form of the glycol slurry used in the same reaction system, while in the case of inactive organic particles, it is desirable that the particles be kneaded into the polyester in the form of a powder or a slurry using a low-boiling solvent such as water. In this case, it is more preferable to use a vent type molding machine for deaeration. The following detailed description is now provided about the case where such inactive organic particles, e.g. crosslinked polymer particles, are used.

According to a method which is preferred because of more uniform monodispersion, a slurry of crosslinked polymer particles in water and/or an organic compound boiling not higher than 200° C. is added to the polyester, then the water and/or the organic compound are (is) removed under heating and reduced pressure, followed by melt-kneading, in a vent type molding machine. The vent type molding machine is a melt molding machine having at least one vent hole, which may be an extruder or an injection molding machine for example. It is necessary that at least one vent hole for the removal of water and/or the organic compound boiling not higher than 200° C. be held under reduced pressure. It is preferable that the vent hole be held at a degree of vacuum of 100 Torr or lower, more preferably 50 Torr or lower, still more preferably 30 Torr or lower.

On the other hand, it is necessary that the crosslinked polymer particles be added to the polyester as a slurry thereof in water and/or an organic compound boiling not higher than 200° C. Examples of such organic compound include alcohols such as methanol, ethanol and ethylene glycol, hydrocarbons such as benzene and toluene, as well as esters, ketones and amines. But there is made no limitation thereto. Above all, water is preferred from the standpoint of handleability and removability. Of course, water and/or such organic compound may be used as a mixed solvent of two or more and in this case a water-rich type mixed solvent is preferred.

Further, from the standpoint of particle dispersibility it is desirable for the slurry of the crosslinked polymer particles to contain substances necessary in preparing the particles such as an anionic surfactant, e.g. sodium dodecylbenzenesulfonate or sodium lauryl sulfate, a nonionic surfactant, e.g. polyoxyethylene nonylphenyl ether or polyethylene glycol monostearate, and a protecting agent, e.g. polyvinyl alcohol or carboxymethyl cellulose.

The concentration of the slurry of the crosslinked polymer particles in water and/or the organic compound boiling not higher than 200° C. is not specially limited, but the amount of water and/or such organic compound to be used is preferably in the range of 2 to 30 wt %, more preferably 2 to 20 wt %, based on the weight of the polymer. This is desirable because there is attained good dispersibility of the particles in the polymer and further because the intrinsic viscosity of the polymer does not lower. As to these inactive particles, two or more different kinds of such particles may be used in combination. In view of the balance of characteristics such as excellent sliding property, abrasion resistance and scratch resistance of film formed from the composition of the invention, it is preferable that the total content of inactive particles in the polyester be in the range of 0.001 to 20 wt %, more preferably 0.005 to 10 wt %, still more preferably 0.01 to 5 wt %.

For preparing a composition containing both the foregoing colloidal silica and inactive particles there may be adopted a method wherein both are added to the polyester reaction system, or a method master chips obtained by separate blendings thereof with the polymer are again blended together followed by melt-kneading.

In a reaction system wherein non-incorporated particles are precipitated by a metal or a phosphorus compound contained in the residue of catalyst at the time of preparation of the polyester, it is also possible to obtain composite particles in a mutually entangled form by adding the colloidal silica particles used in the invention into the said reaction system. The master polymer containing the composite particles thus obtained may be further blended with the master polymer containing other inactive particles followed by melt-kneading.

The polyester used in the present invention is prepared by a polycondensation reaction using as starting materials a bifunctional component such as an aromatic dicarboxylic acid or an alkyl ester thereof and a glycol component. Particularly, a polyethylene terephthalate-based polyester is preferred, which may be either a homopolyester or a copolyester. As examples of such comonomers there are mentioned such dicarboxylic acids as adipic acid,-sebacic acid, phthalic acid, dicarboxylic acid, naphthalene-2,6-dicarboxylic acid, and 5-sodium sulfoisophthalic acid; such polyvalent carboxylic acids as trimellitic acid and pyromellitic acid; such a hydroxycarboxylic acid as p-hydroxyethoxybenzoic acid; and such diols as tetramethylene glycol, hexamethylene glycol, diethylene glycol, propylene glycol, neopentyl glycol, polyoxyalkylene glycol, p-xylylene glycol, 1,4-cyclohexanedimethanol, and 5-sodium sulforesorcin.

For improving an electrostatic castability it is desirable for the thermoplastic polyester composition of the present invention to exhibit a specific resistance of $5\times10^6$ to $5\times10^9\Omega\cdot\text{cm}$ at the time of melting of the polyester. The specific resistance at the time of melting of the polyester as referred to herein indicates a value obtained in the following manner.

This value is determined using a melt specific resistance measuring device which is shown in FIG. 2. The polyester, indicated at 8, as a substance to be measured is placed in a vessel with a pair of electrodes 9 inserted therein. This vessel is then immersed within a heater 7. Then, the polyester 8 is melted at 280° C. in a nitrogen gas atmosphere, to which is then applied a voltage from a high DC voltage generator 4. At this time, a melt specific resistance is determined on the basis of readings on an ammeter 5 and a voltmeter 6, electrode area and an inter-electrode distance, using the following equation:

$$p = \frac{V \times S}{I \times D}$$

p: melt specific resistance ($\Omega\cdot\text{cm}$)
V: applied voltage (V)
S: electrode area ($\text{cm}^2$)
I: measured electric current (A)
D: inter-electrode distance (cm)

The specific resistance at the time of melting of the polyester depends on the kind, state of presence and amount of the metallic compound which is added in the preparation of the polyester. Generally, there is a tendency that the larger the amount of metal in the molten polyester which has not been deactivated by a phosphorus compound for example, and the smaller the amount of the metallic compound precipitated as particles in the polyester, the lower the melt specific resistance.

The relation between the melt specific resistance and metal will be explained below with respect to polyethylene terephthalate (PET) obtained by an ester interchange reaction as an example.

Usually, in an ester interchange reaction, an alkali metal compound, an alkaline earth metal compound, a zinc compound, or a manganese compound, is used as a reaction catalyst, and a phosphorus compound is added at a substantially completed stage of the reaction. The metallic compound which has been used as a reaction catalyst is partially deactivated by the phosphorus compound. The reaction product thus obtained is subjected to a polycondensation reaction in the presence of a polycondensation reaction catalyst such as an antimony compound, a titanium compound or a germanium compound to obtain PET. Usually, PET is prepared through such a process, but it is mainly the alkaline metal compound, alkaline earth metal compound, zinc compound, manganese compound and phosphorus compound that exert an influence on the melt specific resistance. These metallic compounds and phosphorus compound are apt to cause the formation of particles insoluble in the polyester.

As examples of the metallic compound used for controlling the melt specific resistance of the polyester in the present invention there are mentioned glycol-soluble metallic compounds such as aliphatic carboxylates, halides and alcoholates, e.g. methylate, ethylate and ethylene glycolate, of alkaline earth metals, zinc, manganese and alkaline metals. More concrete examples include manganese acetate, magnesium acetate, calcium acetate, zinc acetate, lithium acetate, potassium acetate, sodium acetate, magnesium propionate, manganese propionate, potassium propionate, calcium propionate, zinc propionate, magnesium chloride, lithium chloride, magnesium bromide, magnesium hydroxide, manganese hydroxide, calcium hydroxide, zinc hydroxide, lithium hydroxide, magnesium glycolate, calcium glycolate, lithium methylate, and butypotassium. These compounds may be used in combination of two or more. Particularly, magnesium compounds, manganese compounds and alkali metal compounds are preferred because these compounds suppress the precipitation of particles.

In the case of an ester interchange reaction, the metallic compound may be added in a catalytic amount prior to the same reaction and again added after the reaction. In the case of an esterification reaction, it is preferable that the metallic compound be added after the esterification reaction rate has reached 90% or more, preferably 95% or more.

As the phosphorus compound there may be used at least one member selected from phosphoric acid, phosphorous acid, and esters thereof. Examples are phosphoric acid, menomethyl phosphate, dimethyl phosphate, trimethyl phosphate, tributyl phosphate, phosphorous acid, trimethyl phosphite, and dributyl phosphite.

From the polyester composition there may be produced a biaxially oriented film usually by extruding the composition in the form of sheet, cooling the sheet by means of a casting drum, then stretching the resulting amorphous sheet, followed by heat-setting. In the case where the specific resistance at the time of melting of the polyester is $5\times10^6$ to $5\times10^9\Omega\cdot\text{cm}$, it is desirable to provide an electrode between an extrusion die and the casting drum to apply a high voltage to the sheet, whereby the close contact between the sheet and the drum can be improved, thus leading to the improvement of productivity. Various polymers may be incorporated in the composition as long as they do not impair of the object of the present invention, and organic additives such as antioxidant, thermostabilizer, lubricant and ultra-violet absorber may be added in amounts commonly used.

In the case where film is formed using the thermoplastic polyester composition of the present invention, it is preferable that the film be a composite film from the standpoint of electrode conversion characteristic particularly when the film is for magnetic tape.

The "composite film" as referred to herein indicates a film having at least two layers in the film thickness direction, including those having three or more layers in that direction. It is preferable that the skin layer of at least one side be constituted by the thermoplastic polyester composition of the present invention. If the laminate thickness is t, it is desirable that the following relationship be established between t and the diameter $D_2$ of the colloidal silica particles:

$$0.1\ D_2 \leq t \leq 100\ D_2$$

How to prepare such composite film will now be described concretely. Pellets of the polyester are mixed at a predetermined ratio, then dried, thereafter fed to a known extruder for melt lamination, whereby the mixture is extruded in the form of sheet through a slit-like die, then the sheet is cooled to solidify on a casting roll to obtain unoriented film. Lamination is effected using two or more extruders and a manifold or a junction block (e.g. a junction block having a square joining portion) of two or more layers, and sheet of two or more layers is extruded through the die, then cooled on the casting roll to obtain an unoriented film. In this case, it is effective to provide a static mixer and a gear pump in the polymer flowing path. It is also effective to set the melting temperature in the extruder for the polymer on the top layer side of the laminate at a level 5° to 10° C. lower than that on the base layer side.

Next, the unoriented film is biaxially stretched and oriented. As the stretching method there may be used a successive biaxial stretching method or a simultaneous biaxial stretching method. But it is particularly preferred to use a successive biaxial stretching method wherein stretching is performed first in the longitudinal direction and then in the transverse direction, and divide the longitudinal stretching in three or more stages so that the total longitudinal stretch ratio is in the range of 3.5 to 6.5. The longitudinal stretching temperature differs, depending on the kind of the polyester used, but usually it is effective to set the first-stage temperature at 50° to 130° C. and the second and the following stage temperature at a higher level. A suitable longitudinal stretching rate is 5,000 to 50,000 %/min. Commonly adopted for the transverse stretching is a method using a stenter, and a suitable stretch ratio is in the range of 3.0 to 5.0. The stretching rate and temperature in the transverse direction are suitably in the ranges of 1,000 to 20,000 %/min and 80° to 60° C., respectively. The thus-oriented film is then heat-treated. A suitable heat treatment temperature is in the range of 170° to 220° C., more suitably 180° to 200° C., and a suitable heat treatment time is in the range of 0.2 to 20 seconds.

BEST FORM FOR PRACTICING THE INVENTION

The following examples are given to illustrate the present invention in more detail. In the following examples, characteristic values of the resulting polyester compositions were measured by the following methods.

A. Particle Characteristics (1) Particle diameter ($D_1$ m$\mu$) according to the dynamic light scattering method:

Measured using $N_4$ (a product of Coulter, U.S.A.)

(2) Particle diameter ($D_2$ m$\mu$) according to the nitrogen gas absorbing method:

There was used a particle diameter given by the equation $D_2 = 2720/S$ using the value of a specific surface area S m$^2$/g as measured according to the conventional BET method.

(3) Particle thickness ($D_3$ m$\mu$) in observation using an electron microscope:

The particles-containing polyester compositions were each cut into an ultra-thin piece of 0.3 $\mu$m or so by means of an ultra-thin film forming device, then primary particles were observed using a transmission type electron microscope and the particle thickness was measured. In connection with the primary particles in polyester, a sully was diluted with a mixed solvent of methanol and water, then particles were dispersed therein, and primary particles were observed using a transmission type electron microscope. The particles in polyester which are the same as the said particles are called primary particles.

(4) Amount of a sulfur atom-containing compound:

Measured using a slurry according to ion chromatography.

(5) Amount of Na and that of Ca:

Measured using a slurry according to ion chromatography.

B. Polymer Characteristics (1) Inherent Viscosity (IV)

Measured in ortho-chlorophenol at 25° C., at a concentration of 0.1 g/cc.

(2) Softening Point

Measured by a Benetrometer and shown in terms of SP (°C.) value.

(3) Thermal Stability

Polyester was melted at 300° C. in a nitrogen gas atmosphere, then inherent viscosity in 8 minutes and that in 68 minutes after the start of melting were measured, and the results were shown as $\Delta IV$. The smaller the $\Delta IV$, the higher the thermal stability.

(4) Electrostatic Castability

For melt-extruded film, a DC voltage of 6 kV was applied between a casting drum and an electrode disposed between a die and the drum, and while the casting speed was increased little by little, the casting speed (m/min) upon occurrence of unevenness in the voltage application was measured. Thus, the higher the said speed, the more improvement is attained in productivity and thus the more desirable.

C. Film Characteristics (1) Asperity Ra ($\mu$m)

As the value of asperity, a center line average height was measured under the conditions of needle diameter 2 $\mu$m, load 70 mg, reference measurement length 0.25 mm and cut-off 0.08 mm, using a surfcom surface roughness tester, according to JIS-B-0601.

(2) Sliding Property ($\mu_k$)

Film was slit into $\frac{1}{2}$ inch, then was allowed to travel at 20° C. in a 60% RH atmosphere, using a tape traveling tester TBT-300 (a product of Yokohama System Kenkyu-Sho Co.), and an initial $\mu_k$ value was determined in accordance with the following equation. Guide diameter is 6 mm, guide material is SUS27 (asperity 0.2S), winding angle is 180°, and traveling speed is 3.3 cm/sec.

$\mu_k = 0.733 \log (T_1/T_2)$ $T_1$: outlet side tension
$T_2$: inlet side tension A value of the above $\mu_k$ not larger than 0.35 indicates a good sliding property. If the $\mu_k$ value is larger than 0.35, the sliding property during the formation of film or of the resulting product will be extremely poor.

(3) Abrasion Resistance

Test ①

Film was slit into a tape-like roll of a small width, then this roll was rubbed against a guide roll made of stainless steel SUS-304 at high speed under a constant tension for a long time, and ranking was made as follows according to the amounts of white powder produced on the guide roll surface:

Class A ... White powder was not produced at all.
" B ... White powder was produced a small amount.
" C ... White powder was produced a relatively large amount.
" D ... White powder was produced a large amount.

Test ②

Test was conducted in just the same conditions as in Test ① except that a guide roll made of polyacetal was used in place of the guide roll made of stainless steel SUS-304, and ranking was made as follows according to the amounts of white powder produced on the guide roll surface:

Class A ... White powder was not produced at all.
" B ... White powder was produced a small amount.
" C ... White powder was produced a relatively large amount.
" D ... White powder was produced a large amount.

(4) Scratch Resistance

Film was slit in the form of tape having a width of ½ inch and this tape was allowed to travel on a guide pin (asperity: 0.1 μm as Ra) using a tape travelling tester. (Traveling speed: 1,000 m/min, number of times of traveling: 15 passes, winding angle: 60°, traveling tension: 65 g)

The film was observed for scratch using a microscope, and ranking was made as follows:

Class A ... two or less of scratches each 2.5 μm or larger in width, per tape width
" B ... not less than two and less than three
" C ... not less than three and less than ten
" D ... ten or more (5) Thickness of Skin Layer Using a secondary ion mass spectrograph (SIMS), there is made an analysis in the depth (thickness) direction from the surface of polyester A layer, assuming that in the internal particles of film, a concentration ratio ($M^+/C^+$) of an element based on the highest concentration of particles to the carbon element of polyester is a particle concentration. In the skin layer, the particle concentration is low due to the surface, or interface, and it is higher in positions away from the surface.

In the case of film formed according to the present invention, the particle concentration which has once reached the maximum value at depth [I] begins to decrease again. A depth [II] (II>I) corresponding to one half of the maximum particle concentration, based on such a concentration distribution curve, was assumed to be a laminate thickness. In the case where the particles contained in the largest proportion in film are organic polymer particles, it is difficult to made measurement using SIMS, so a depth profile of the particle concentration may be determined using XPS (X-ray electronic spectroscopy), IR (infrared spectroscopy), or a confocal microscope, while etching is performed from the surface, and then a laminate thickness may be determined in the same way as above. Also, the laminate thickness can be determined by observing the cross section of film or by using a thin-film step measuring device, not on the basis of the aforementioned depth profile.

(6) Electromagnetic Conversion Properties

A magnetic coating material of the composition described below is applied to film by means of a gravure roll, and the film is oriented magnetically, then dried. Then, the film is calendered at a temperature of 70° C. and a linear pressure of 200 kg/cm, using a small-sized test calender (steel rolls/nylon rolls, five stages), followed by curing at 70° C. for 48 hours. The tape thus obtained was slit into ½ inch to form pancake. From this pancake a length of 250 m was incorporated into a VTR cassette as a VTR cassette tape.

(Composition of the magnetic coating material)

| | part by weight |
| --- | --- |
| Co-containing iron oxide | 100 |
| Vinyl chloride/vinyl acetate copolymer | 10 |
| Polyurethane elastomer | 10 |

-continued

| | part by weight |
| --- | --- |
| Polyisocyanate | 5 |
| Lecithin | 1 |
| Methyl ethyl ketone | 75 |
| Methyl isobutyl ketone | 75 |
| Toluene | 75 |
| Carbon black | 2 |
| Lauric acid | 1.5 |

In this tape there was recorded a 100% chroma signal by means of a television test waveform generator, using a home VTR, and from a reproduced signal thereof, a chroma S/N ratio was measured by means of a color video noise measuring device.

EXAMPLE 1

First, there was prepared 100 parts by weight of a slurry comprising 5 parts by weight of amorphous colloidal silica particles having a particle diameter $D_1$ of 163 mμ as measured by the dynamic light scattering method, a particle diameter $D_2$ of 46 mμ as measured by the BET method and a particle thickness of 50 mμ as observed using a transmission type electron microscope, 95 parts by weight of ethylene glycol, 1,700 ppm, as $SO_3$ relative to $SiO_2$, of a sulfur atom-containing compound, 6,500 ppm of Na as $Na_2O$ relative to $SiO_2$, and 930 ppm of Ca as CaO relative to $SiO_2$.

Then, using 100 parts by weight of dimethyl terephthalate, 62 parts by weight of ethylene glycol and 0.06 part by weight of magnesium acetate, an ester interchange reaction was performed. Then, 6 parts by weight of the slurry prepared above and 0.03 part by weight of antimony oxide were added and a polycondensation reaction was conducted to afford a polyethylene terephthalate composition having a [η] of 0.610 and a melt specific resistance of $3 \times 10^7 \Omega \cdot cm$. The composition thus obtained was melt-extruded at 290° C. to obtain unoriented film. The casting speed was 62 m/min. Further, the film was stretched to 3× in both longitudinal and transverse directions at 90° C., followed by heat-treatment at 220° C. for 10 seconds, to obtain a 15 μm thick film. This film, having Ra of 0.006 μm and $\mu_k$ of 0.25, ranked class A in the abrasion resistance test ①, class B in the abrasion resistance test ②, and class A in scratch resistance.

EXAMPLES 2-8

Polyester compositions and biaxially oriented films were prepared in the same way as in Example 1 while changing the particle diameter $D_1$ of colloidal silica particles as measured by the dynamic light scattering method, $D_1/D_2$ ratio, particle thickness, slurry concentration, amount of slurry relative to polyester, and the contents of sulfur atom-containing compound, Na and Ca.

The particle diameter $D_1$, $D_1/D_2$, particle thickness, the content of sulfur atom-containing compound, Na content, Ca content, the concentration and amount of slurry, [η] of the resulting polyester, as well as Ra, $\mu_k$, abrasion resistance and scratch resistance of film, in each Example are as shown in Table 1. As can be seen from Table 1, the biaxially oriented films obtained proved to have sliding property, abrasion resistance and scratch resistance which were fully satisfactory for use as magnetic tapes. Particularly, in each of Examples 1, 3, 4 and 5, the $D_1/D_2$ value is smaller than 5, the content of sulfur atom-containing compound in slurry is in the range of 50 to 3,000 ppm (weight ratio) as $SO_3$ relative to $SiO_2$, and the Na content of slurry is in the range of 1,000 to 20,000 ppm (weight ratio) as $Na_2O$ relative to $SiO_2$, thus demonstrating good sliding property and abrasion resistance.

EXAMPLE 9

Undried polyethylene terephthalate chips having a water content of 0.2 wt % and an intrinsic viscosity of 0.620 were melted using a biaxial vent extruder, then an aqueous slurry (2 wt % based on the polymer) of polydivinylbenzene particles (volumetric shape parameter: 0.51) having an average particle diameter of 0.3 $\mu m$ and containing sodium salt of carboxyl group as a functional group was added so as to give a final content thereto in the polymer of 2.0 wt %, followed by melt-extrusion at a resin temperature of 280° C. while the vent hole was held at a vacuum degree of 10 Torr, to afford a plydivinylbenzene particles-containing polyethylene terephthalate (I). The intrinsic viscosity of the polymer thus obtained was 0.612.

On the other hand, there was prepared 100 parts by weight of a slurry comprising 5 parts by weight of amorphous colloidal silica particles having a particle diameter $D_1$ of 148 m$\mu$ as measured by the dynamic light scattering method, a particle diameter $D_2$ of 45 m$\mu$ as measured by the BET method and a particle thickness of 50 m$\mu$ as observed using a transmission type electron microscope, 95 parts by weight of ethylene glycol, 1,700 ppm, as $SO_3$ relative to $SiO_2$, of a sulfur atom-containing compound 6,500 ppm of Na as $Na_2O$ relative to $SiO_2$ and 930 ppm of Ca as CaO relative to $SiO_2$.

Then, using 100 parts by weight of dimethyl terephthalate, 62 parts by weight of ethylene glycol and 0.06 part by weight of magnesium acetate, an ester interchange reaction was performed. Then, 40 parts by weight of the slurry prepared above and 0.03 part by weight of antimony oxide were added and a polycondensation reaction was conducted to afford a polyethylene terephthalate composition (II) having a $[\eta]$ of 0.61.

Next, 10 parts by weight of the polyester (I), 10 parts by weight of the polyester (II) and 80 parts by weight of polyethylene terephthalate not containing particles were melt-mixed at 290° C. in a nitrogen gas atmosphere to obtain a polyethylene terephthalate composition (X) containing both colloidal silica particles and polydivinylbenzene particles.

Then, the composition (X) was melt-extruded at 290° C. to give unoriented film. The film was then stretched to 3.5× in both longitudinal and transverse directions at 90° C., followed by heat-setting at 210° C. for 5 seconds to afford a 5 $\mu m$ thick film. This film, having Ra of 0.016 $\mu m$ and $\mu_K$ of 0.17, ranked class A in both abrasion resistance tests ①and ② and class A also in scratch resistance.

EXAMPLES 10–15

Polyester compositions and biaxially oriented films were prepared in the same way as in Example 9 while changing the kind, diameter and amount of the particles used together with the colloidal silica particles. The results obtained are as shown in Table 2, from which it is seen that the films are superior in sliding property, abrasion resistance and scratch resistance.

EXAMPLE 16

There was formed a biaxially oriented polyester film having a total thickness of 15 $\mu m$, including a 1$\mu$ thick layer of the polyethylene terephthalate composition (X) prepared in Example 9, laminated to the skin layer. This film, having Ra of 0.015 $\mu m$ and $\mu_k$ of 0.17, ranked class A in both abrasion resistance tests ① and ② and class A also in scratch resistance. Further, an electromagnetic conversion properties of the film was determined by the foregoing method and it was found to be +2.5 dB and thus superior in comparison with the film formed in Example 9.

Comparative Examples 1–7

Polyester compositions and biaxially oriented films were obtained in the same way as in Example 1 while changing the shape, $D_1/D_2$, $D_1$ and thickness of the particles. The particles diameter $D_1$, $D_1/D_2$, particle thickness, the content of the sulfur atom-containing compound, Na content, Ca content, the concentration and amount of the slurry, $[\eta]$ of the resulting polyester, asperity Ra, $\mu_k$, resistance to abrasion and to scratch of film in each Comparative Example are as shown in Table 3. As is seen from this table, there was not obtained any product satisfying all of good sliding property and high abrasion resistance and scratch resistance. In Comparative Example 1 it is presumed that the deterioration of abrasion resistance and scratch resistance is because of sharp prominence based on spherical, amorphous, colloidal silica particles. In Comparative Example 2, a satisfactory result was not obtained because of a $D_1/D_2$ value outside the range defined in the present invention. In Comparative Example 3, a satisfactory result was not obtained because of a $D_1$ value exceeding 600 m$\mu$. In Comparative Example 4 it is presumed that the dispersibility was deteriorated because of a small particle thickness. And in Comparative Example 5, the tendency to agglomeration is strong and particularly the abrasion resistance and scratch resistance were deteriorated because not only $D_1$ exceeds 600 m$\mu$ but also $D_1/D_2$ is larger than 20.

TABLE 1

| | | Example 1 | Example 2 | Example 3 | Example 4 | Example 5 | Example 6 | Example 7 | Example 8 |
|---|---|---|---|---|---|---|---|---|---|
| Particle | Kind | $SiO_2$ | $SiO_2$ | $SiO_2$ | $SiO_2$ | $SiO_2$ | $SiO_2$ | $SiO_2$ | $SiO_2$ |
| | Diameter $D_1$ (m$\mu$) | 163 | 360 | 192 | 163 | 163 | 163 | 163 | 163 |
| | $D_1/D_2$ (—) | 3.5 | 8.2 | 3.2 | 3.5 | 3.5 | 3.5 | 3.5 | 3.5 |
| | Thickness (m$\mu$) | 44 | 42 | 63 | 44 | 44 | 44 | 44 | 44 |
| | Sulfur Content ($SO_3$, ppm) | 1700 | 2250 | 1500 | 1700 | 1700 | 12 | 1700 | 1700 |
| | Na Content ($Na_2O$, ppm) | 6500 | 5500 | 5700 | 6500 | 6500 | 6500 | 32000 | 6500 |
| | Ca Content (CaO, ppm) | 930 | 850 | 870 | 930 | 930 | 930 | 930 | 1400 |
| | Slurry Concentration (wt %) | 5.0 | 5.0 | 5.0 | 2.0 | 5.0 | 5.0 | 5.0 | 5.0 |
| | Amount (wt %) | 0.3 | 0.3 | 0.5 | 0.3 | 0.5 | 0.3 | 0.3 | 0.3 |
| Polymer | Softening Point, SP Value (°C.) | 260.0 | 259.9 | 260.0 | 259.7 | 259.8 | 260.1 | 260.0 | 259.8 |
| | Thermal Stability $\Delta IV$ | 0.012 | 0.011 | 0.011 | 0.013 | 0.011 | 0.012 | 0.011 | 0.013 |
| | Inherent Viscosity $[\eta]$ | 0.610 | 0.614 | 0.618 | 0.617 | 0.618 | 0.618 | 0.604 | 0.615 |
| Film | Ra ($\mu m$) | 0.006 | 0.005 | 0.009 | 0.004 | 0.008 | 0.015 | 0.016 | 0.013 |

TABLE 1-continued

|  | Example 1 | Example 2 | Example 3 | Example 4 | Example 5 | Example 6 | Example 7 | Example 8 |
|---|---|---|---|---|---|---|---|---|
| Sliding Property ($\mu_k$) | 0.25 | 0.27 | 0.25 | 0.26 | 0.24 | 0.23 | 0.25 | 0.21 |
| Abrasion Resistance Test ① | A | B | A | A | A | B | B | B |
| Abrasion Resistance Test ② | B | B | B | B | B | B | B | B |
| Scratch Resistance | A | A | A | A | A | B | B | A |

TABLE 2

| | | Example 9 | Example 10 | Example 11 | Example 12 |
|---|---|---|---|---|---|
| Added Particles | Kind | $SiO_2$/DBV*[1] | $SiO_2$/DBV.EBV*[2] | $SiO_2$/DBV.BA*[3] | $SiO_2$/DBV.BA (OH modified) |
| | Diameter Average Diameter ($\mu$m) | —/0.3 | —/0.6 | —/0.6 | —/0.45 |
| | $D_1$ (m$\mu$) | 148/— | 188/— | 170/— | 165/— |
| | $D_1/D_2$ | 3.3/— | 4.5/— | 2.8/— | 3.3/— |
| | Thickness (m$\mu$) | 50/— | 44/— | 50/— | 46/— |
| | Sulfur Content ($SO_3$, ppm) | 1700/— | 1700/— | 1000/— | 1800/— |
| | Na Content ($Na_2O$, ppm) | 6500/— | 6500/— | 10000/— | 7000/— |
| | Ca Content (CaO, ppm) | 930/— | 850/— | 930/— | 950/— |
| | Thermal Decomposition Temperature (°C) | —/420 | —/405 | —/410 | —/402 |
| | Amount (wt %) | 0.2/0.2 | 0.3/0.1 | 0.3/0.1 | 0.3/0.3 |
| Characteristics of Film | Ra ($\mu$m) | 0.016 | 0.013 | 0.014 | 0.015 |
| | Sliding Property ($\mu_k$) | 0.17 | 0.23 | 0.23 | 0.15 |
| | Abrasion Resistance Test ① | A | B | A | A |
| | Abrasion Resistance Test ② | A | A | A | A |
| | Scratch Resistance | A | A | A | A |

| | | Example 13 | Example 14 | Example 15 |
|---|---|---|---|---|
| Added Particles | Kind | $SiO_2$/$CaCO_3$ | $SiO_2$/$TiO_2$ | $SiO_2$/$Ca_3(PO_4)_2$ |
| | Diameter Average Diameter ($\mu$m) | —/0.6 | —/0.3 | —/0.5 |
| | $D_1$ (m$\mu$) | 165/— | 163/— | 165/— |
| | $D_1/D_2$ | 3.5/— | 3.5/— | 3.5/— |
| | Thickness (m$\mu$) | 45/— | 44/— | 45/— |
| | Sulfur Content ($SO_3$, ppm) | 1700/— | 1700/— | 1700/— |
| | Na Content ($Na_2O$, ppm) | 6500/— | 6500/— | 6500/— |
| | Ca Content (CaO, ppm) | 930/— | 930/— | 950/— |
| | Amount (wt %) | 0.3/0.1 | 0.3/0.4 | 0.3/0.2 |
| Characteristics of Film | Ra ($\mu$m) | 0.015 | 0.016 | 0.016 |
| | Sliding Property ($\mu_k$) | 0.29 | 0.18 | 0.18 |
| | Abrasion Resistance Test ① | A | A | A |
| | Abrasion Resistance Test ② | B | B | B |
| | Scratch Resistance | B | A | A |

*[1]DVB: Polydivinylbenzene polymer (COONa modified)
*[2]DBV.EBV: Divinylbenzene-ethylvinylbenzene (50:50) copolymer
*[3]DBV.BA: Divinylbenzene-butyl acrylate (50:50) copolymer

TABLE 3

| | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Particle | Kind | $SiO_2$ | $SiO_2$ | $SiO_2$ | $SiO_2$ | $SiO_2$ | $\delta$type $Al_2O_3$ | $\gamma$type $Al_2O_3$ |
| | Diameter $D_1$ (m$\mu$) | 50 | 67 | 870 | 400 | 972 | 125 | 223 |
| | $D_1/D_2$ (—) | 1.1 | 1.3 | 14.3 | 16.0 | 23.0 | 5.0 | 6.6 |
| | Thickness (m$\mu$) | 48 | 48 | 62 | 25 | 42 | 25 | 33 |
| | Sulfur Content ($SO_3$, ppm) | 15 | 1200 | 1700 | 80 | 120 | 0 | 230 |
| | Na Content ($Na_2O$, ppm) | 310 | 4500 | 5800 | 6000 | 6700 | 15 | 20 |
| | Ca Content (CaO, ppm) | 0 | 300 | 840 | 1900 | 980 | 0 | 5 |
| | Slurry Concentration (wt %) | 5.0 | 5.0 | 5.0 | 5.0 | 5.0 | 5.0 | 5.0 |
| | Amount (wt %) | 0.3 | 0.3 | 0.3 | 0.3 | 0.3 | 0.3 | 0.3 |
| Polymer | Softening Point, SP Value (°C) | 259.8 | 260.1 | 260.0 | 259.8 | 260.1 | 258.7 | 258.3 |
| | Thermal Stability $\Delta$IV | 0.012 | 0.011 | 0.011 | 0.013 | 0.011 | 0.029 | 0.028 |
| | Inherent Viscosity [$\eta$] | 0.617 | 0.620 | 0.612 | 0.611 | 0.614 | 0.618 | 0.617 |
| Film | Ra ($\mu$m) | 0.003 | 0.005 | 0.018 | 0.016 | 0.023 | 0.013 | 0.014 |
| | Sliding Property ($\mu_k$) | 0.34 | 0.27 | 0.19 | 0.25 | 0.18 | 0.24 | 0.23 |
| | Abrasion Resistance Test ① | D | C | C | C | D | A | A |
| | Abrasion Resistance Test ② | D | C | C | C | D | B | B |
| | Scratch Resistance | D | C | C | C | D | A | B |

INDUSTRIAL UTILIZATION FIELD

The thermoplastic polyester compositions of the present invention contain fine colloidal silica particles having a straight-chain or branched shape, and when formed into shaped articles, the width of prominence formed on the shaped article surface is large, so the impact exerted on the shaped article surface from another contacting article is small. Besides, the particles are difficult to drop out due to such shape. Further, the thermoplastic polyester compositions of the invention has a surface layer reinforcing effect over a wide area, so exhibit good sliding property and high resistance to abrasion and to scratch when formed into fibers, films or other shaped articles. When the polyester compositions of the present invention are used in combination with inactive particles, a further improvement can be attained in the sliding property and the resistance to abrasion and to scratch. And in the case where the polyester compositions of the invention are each used as the skin layer of a composite film, the composite film having such top layer is suitable for use as a magnetic tape which is used repeatedly in a rubbed state.

We claim:

1. A thermoplastic polyester composition comprising a thermoplastic polyester and colloidal silica particles,
    said colloidal silica particles having a ratio of a particle diameter ($D_1$ m$\mu$) measured by a dynamic light by a nitrogen gas absorbing method, $D_1/D_2$, of 2 or more, $D_1$ being in the range of 60 to 600 m$\mu$, further having a thickness in the range of 41 to 100 m$\mu$ is observation using an electron microscope, and having a straight-chain or branched shape, wherein said silica particles are substantially free of agglomerations.

2. A thermoplastic polyster composition prepared by adding a slurry of the following components (a), (b) and (c) in any polyester production stage: (a) colloidal silica particles having a ratio of a particle diameter ($D_1$ m$\mu$) measured by a dynamic light scattering method to a particle diameter ($D_2$ m$\mu$) measured by a nitrogen gas absorbing method, $D_1/D_2$, or more, $D_1$ being in the range of 60 to 600 m$\mu$, further having a thickness in the range of 41 to 100 m$\mu$ is observation using an electron microscope, and having a straight-chain or branched shape, said silica particles being substantially free of agglomerations, (b) 50 to 3,000 ppm (weight ratio) as $SO_3$, relative to the $SiO_2$ which constitutes said colloidal silica particles, of a sulfur atom-containing compound, (c) 1,000 to 20,000 ppm (weight ratio) as $Na_2O$, relative to the $SiO_2$ which constitutes said collidal silica particles, of Na atom.

3. A thermoplastic polyester composition as set forth in claim 1 or claim 2, wherein said $D_1/D_2$ ratio is not less than 2 and less than 5, and said $D_1$ is in the range of 60 to 200 m$\mu$.

4. A thermoplastic polyester composition as set forth in claim 2, further comprising inactive particles.

5. A thermoplastic polyester composition as set forth in claim 4, wherein the diameter of said inactive particles is larger than that of said colloidal silica particles.

6. A thermoplastic polyester composition as set forth in claim 4, wherein said inactive particles are inactive inorganic particles.

7. A thermoplastic polyester composition as set forth in claim 4, wherein said inactive particles are inactive organic particles.

8. A thermoplastic polyester composition as set forth in claim 6, wherein said inactive inorganic particles are the particles of at least one member selected from titanium oxide, silicon oxide, calcium carbonate and calcium phosphate.

9. A thermoplastic polyester composition as set forth in claim 7, wherein said inactive organic particles are crosslinked polymer resin particles.

10. A thermoplastic polyester composition as set forth in claim 1 further comprising inactive particles.

11. A thermoplastic polyester composition as set forth in claim 10, wherein the diameter of said inactive particles is larger than that of said colloidal silica particles.

12. A thermoplastic polyester composition as set forth in claim 10, wherein said inactive particles are inactive inorganic particles.

13. A thermoplastic polyester composition as set forth in claim 10, wherein said inactive particles are inactive organic particles.

14. A thermoplastic polyester composition as set forth in claim 12, wherein said inactive inorganic particles are the particles of at least one member selected from titanium oxide, silicon oxide, calcium carbonate and calcium phosphate.

15. A thermoplastic polyester composition as set forth in claim 13, wherein said inactive organic particles are crosslinked polymer resin particles.

* * * * *

UNITED STATES PATENT AND TRADEMARK OFFICE
CERTIFICATE OF CORRECTION

PATENT NO.  : 5,397,827
DATED       : March 14, 1995
INVENTOR(S) : Masahiro Kimura, et. al.

It is certified that error appears in the above-indentified patent and that said Letters Patent is hereby corrected as shown below:

Title page, item [22], change "May 19, 1992" to --September 20, 1991--.
Column 1, line 29, change "(JP52-864791A)" to --(JP52-86471A)--.
Column 3, line 25, change "face" to --fact--; and
          line 38, change "it not" to --it is not--.
Column 7, line 26, change "was" to --way--.
Column 8, line 57, change"acid,-sebacic"to --acid, sebacic--.
Column 10, line 39, delete "of", first occurrence.
Column 11, line 28, change "60 C" to --160 C--.
Column 15, line 9, change "0.2" to --0.2 to 0.4--;
           line 19, change "plydivinylbenzene" to --polydivinylbenzene--;
           line 53, change "5" to --15--.
           line 54, change "√K" to --√k--.
Column 19, line 28, change "D$_1$/D$_2$," to --D$_1$/D$_2$ of 2--.

Signed and Sealed this

First Day of August, 1995

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,397,827
DATED : March 14, 1995
INVENTOR(S) : Masahiro Kimura, Tomoji Saeki, Masaru Suzuki, Minoru Yoshida and Toshihiro Sasaki It is certified that error appears in the above-indentified patent and that said Letters Patent is hereby corrected as shown below:

In Column 19, line 14, after "dynamic light", please insert -- scattering method to a particle diameter ($D_2m\mu$) measured--.

Signed and Sealed this

Nineteenth Day of September, 1995

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO.  : 5,397,827
DATED       : March 14, 1995
INVENTOR(S) : Masahiro Kimura, et. al.

It is certified that error appears in the above-indentified patent and that said Letters Patent is hereby corrected as shown below:

Title page, item [22], change "May 19, 1992" to --September 20, 1991--.
Column 1, line 29, change "(JP52-864791A)" to --(JP52-86471A)--.
Column 3, line 25, change "face" to --fact--; and
          line 38, change "it not" to --it is not--.
Column 7, line 26, change "was" to --way--.
Column 8, line 57, change"acid,-sebacic"to --acid, sebacic--.
Column 10, line 39, delete "of", first occurrence.
Column 11, line 28, change " 60°C" to --160°C--.
Column 15, line 9, change "0.2" to --0.2 to 0.4--;
           line 19, change "plydivinylbenzene" to --polydivinylbenzene--;
           line 53, change "5" to --15--.
           line 54, change "$\mu_K$" to --$\mu_k$--.
Column 19, line 28, change "$D_1/D_2$," to --$D_1/D_2$, of 2--.

Signed and Sealed this

Twenty-third Day of April, 1996

Attest:

BRUCE LEHMAN

*Attesting Officer*    Commissioner of Patents and Trademarks